United States Patent [19]
Faith

[11] 3,818,028

[45] June 18, 1974

[54] SUBSTITUTED-5-(2,4,6-TRIHALOPHENOXY)-METHYL)-2-OXAZOLINE COMPOUNDS

[75] Inventor: Herman Eldridge Faith, Indianapolis, Ind.

[73] Assignee: The Dow Chemical Company, Midland, Mich.

[22] Filed: Nov. 1, 1972

[21] Appl. No.: 302,873

[52] U.S. Cl............ 260/307 F, 260/570.7, 424/272
[51] Int. Cl.............................................. C07d 85/36
[58] Field of Search................................. 260/307 F

[56] References Cited
UNITED STATES PATENTS
3,637,726    1/1972    Faith .............................. 260/307 F Primary Examiner—Donald G. Daus
Assistant Examiner—Raymond V. Rush
Attorney, Agent, or Firm—Maynard R. Johnson

[57] ABSTRACT

Substituted-5-[(2,4,6-trihalophenoxy)methyl]-2-oxazoline compounds and their pharmaceutically acceptable salts, such as 2-amino-5-[(2,4,6-trichlorophenoxy)methyl]-2-oxazoline and 2-(imino)-5-[(2,4,6-trichlorophenoxy)methyl]-3-methyl-2-oxazolidine hydrobromide are prepared by the reaction of a substituted 1-amino-3-(2,4,5-trihalophenoxy)-2-propanol with cyanogen bromide. The novel compounds have central nervous system activity and are useful as antidepressants.

6 Claims, No Drawings

SUBSTITUTED-5-(2,4,6-TRIHALOPHENOXY)-METHYL)-2-OXAZOLINE COMPOUNDS

BACKGROUND OF THE INVENTION

The substituted 1-amino-3-(2,4,6-trihalophenoxy)-2-propanol starting materials useful in the preparation of the compounds of this invention can be prepared by the reaction of ammonia or methylamine with 1,2-epoxy-3-(2,4,6-trihalophenoxy)propane in a procedure similar to that disclosed by Boyd, J. Chem. Soc. 97, 1791 (1910). Aryloxazolines and aryloxymethyloxazolines are disclosed in Poos et al., J. Med. Chem. 6, 266 (1963), and U. S. Pat. Nos. 3,317,553 and 3,637,726.

SUMMARY OF THE INVENTION

This invention relates to substituted-5-[(2,4,6-trihalophenoxy)methyl]-2-oxazoline compounds corresponding to the formula

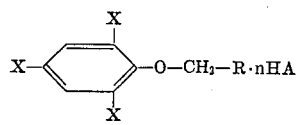

wherein X independently in each occurrence thereof represents chloro or bromo; R represents 2-amino-2-oxazolin-5-yl or 2,3-dihydro-2-imino-3-methyl-2-oxazolin-5-yl; n represents one of the integers zero and one, and HA represents the acid moiety of a non-toxic acid addition salt. The oxazoline compounds of the invention may also be represented as corresponding to one of the formulae

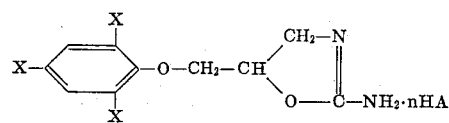

and

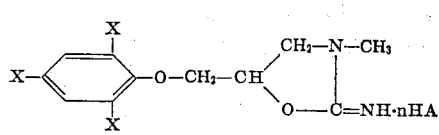

wherein X, n and HA have the significance set out above. The term "pharmaceutically acceptable salt" as herein employed refers to a salt of a compound of the above formula which is substantially non-toxic and innocuous when such a salt is employed as an antidepressant agent at a dosage rate consistent with good pharmacological activity. Such pharmaceutically acceptable salts include salts with inorganic acids such as hydrochloric, hydrobromic, sulfuric, nitric or phosphoric acid, or with organic acids such as acetic, succinic, toluenesulfonic, lactic, malic, maleic, tartaric or citric acid.

The compounds of the invention corresponding to formula I are named as substituted oxazoline compounds while those corresponding to formula II can be named either as substituted 2,3-dihydro-oxazoline compounds or as substituted oxazolidine compounds. For the sake of convenience, the compounds corresponding to the above formulae will be generically referred to hereinafter as "oxazoline compounds."

The oxazoline compounds of the invention are crystalline solids which are of varying degrees of solubility in aqueous acids and in organic liquids such as ether, alcohols, tetrahydrofuran, chlorinated hydrocarbons, lower alkanes and esters such as ethyl acetate and which are slightly soluble in water. The non-toxic acid addition salts of the oxazoline compounds are crystalline solids which are slightly soluble in benzene and ethers and moderately soluble in water and alcohols.

The oxazoline compounds of the invention have been found to be useful for administration to animals in the study of drug effects on the central nervous system, and have been found to be particularly useful as antidepressants as indicated by their antagonism of the depressant effects of reserpine and their potentiation of amphetamine. Preferred compounds for such use are those corresponding to formula I above wherein X is the same in all three occurrences thereof and wherein R represents 2-amino-2-oxazolin-5-yl (such compounds also corresponding to formula II). The compounds 2-amino-5-[(2,4,6-trichlorophenoxy)methyl]-2-oxazoline and its non-toxic acid addition salts are particularly preferred.

The novel compounds can be prepared by the reaction of a substituted 1-amino-3-(3,4,6-trihalophenoxy)-2-propanol corresponding to the formula

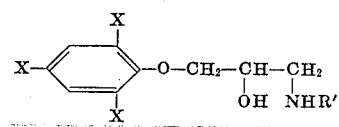

with cyanogen bromide. In the above formula R' represents hydrogen or methyl. The substituted 1-amino-3-(2,4,6-trihalophenoxy)-2-propanol compounds are conveniently prepared by the reaction of 1,2-epoxy-3-(2,4,6-trihalophenoxy)propane with excess ammonia or methylamine. The reaction of the 1,2-epoxy-3-(2,4,6-trihalophenoxy)propane with ammonia or methylamine is typically carried out by contacting such reactants in ethanol or methanol as a reaction medium, typically at a temperature of from 40°C. to the boiling point for about 3 to 6 hours.

The reaction of the substituted 1-amino-3-(2,4,6-trihalophenoxy)-2-propanol with cyanogen bromide proceeds with production of a 2-amino-5-[(2,4,6-trihalophenoxy)methyl]-2-oxazoline compound corresponding to formula I wherein R is 2-amino-2-oxazolin-5-yl (the compound thus also corresponding to formula II) when a 1-amino-3-(2,4,6-trihalophenoxy)-2-propanol corresponding to formula IV wherein R' is hydrogen is employed as a starting material. A compound of formula IV wherein R' is methyl is employed as a starting material when it is desired to obtain an oxazoline compound corresponding to formula I wherein R is 2,3-dihydro-2-imino-3-methyl-2-oxazolin-5-yl, the compound also corresponding to formula III.

The reaction proceeds when the reactants are contacted and mixed, typically in the presence of an inert organic liquid as a reaction medium, and in the presence of a hydrogen halide acceptor. Representative inert organic liquids which can be employed as reaction media include chloroform, tetrahydrofuran, methylene chloride, ether, methanol, ethanol and ethylene chloride. Representative hydrogen halide acceptors which can be employed include sodium acetate, sodium carbonate, trimethylamine, triethylamine, pyridine, lutidine and the like, weaker bases such as sodium acetate being preferred. The reaction proceeds at temperatures of from about 0° to about 100°C. and is preferably carried out at a temperature of from about 0°C. to about 30°C. The exact proportions of the reactants to be employed is not critical; however, the reaction consumes the substituted 1-amino-3-(2,4,6-trihalophenoxy)-2-propanol and the cyanogen bromide reactants in equimolar proportions and the reactants are preferably employed in substantially such proportions. An excess of the hydrogen halide acceptor is preferably employed, generally from about 5 to 15 molar proportions of hydrogen halide acceptor for each molar proportion of cyanogen bromide. The reaction is generally complete in about 1 to about 48 hours depending upon the reaction temperature employed. Salt by-products formed by the reaction of the hydrogen halide of reaction with the hydrogen halide acceptor can be separated from the reaction mixture or from the product by filtration and washing, extraction or the like. The product can also be separated by conventional procedures such as by evaporation under reduced pressure to remove the reaction medium, followed by treatment with an aqueous base such as sodium carbonate or sodium hydroxide and extraction of resulting aqueous mixture with a halogenated hydrocarbon solvent. The separated material can be purified by recrystallization, extraction, washing, or other conventional procedures. Alternatively, the product can be converted to a pharmaceutically-acceptable acid addition salt and purified in the form of the salt.

The pharmaceutically acceptable acid addition salts of the oxazoline compounds are conveniently prepared by dissolving the free base compound in a solvent such as methanol, ethanol or ether and thereafter adding an excess of a suitable acid such as hydrochloric, hydrobromic, sulfuric, malic, maleic or citric acid or the like. Ether is then added until precipitation of the salt product is complete. The reaction is conveniently carried out at room temperature. The product can be separated by conventional procedures such as evaporation, filtration or centrifugation and purified by conventional procedures such as recrystallization.

The free base oxazoline compounds can be prepared from the salts by mixing the salt or a solution of the salt in a minimal amount of methanol with an excess of an aqueous base such as sodium hydroxide, potassium hydroxide or sodium carbonate. The free base oxazoline compound can be separated by conventional procedures such as extraction with an organic solvent such as benzene, ether, or a chlorinated hydrocarbon solvent. The free base can be purified by conventional procedures such as recrystallization or it can be converted to a pharmaceutically acceptable acid addition salt.

DESCRIPTION OF THE PREFERRED EMBODIMENTS

The following example is illustrative of the invention but is not intended to limit the same.

EXAMPLE

Cyanogen bromide (3.5 grams; 0.03 mole) is dissolved in 5 milliliters of methanol. The solution is added portionwise over a 15 minute period to a solution of 1-amino-3-(2,4,6-trichlorophenoxy)-2-propanol (8.1 grams; 0.03 mole) and 7.4 grams of sodium acetate in 100 milliliters of methanol. During the addition the mixture is maintained at a temperature of 15°–20°C. The mixture is stirred at a temperature of 20°C. for one hour, and stirred at room temperature (about 25°C.) for 18 hours. The mixture is evaporated under reduced pressure and the residue is taken up in aqueous 2 Normal sodium hydroxide solution. The aqueous basic mixture is extracted with chloroform, and the chloroform extract is dried with anhydrous sodium carbonate, filtered to remove sodium carbonate and evaporated under reduced pressure. The 2-amino-5-[(2,4,6-trichlorophenoxy)methyl]-2-oxazoline free base product is obtained as a residue from the evaporation. The product is dispersed in a small amount of methanol and the methanol solution is mixed with excess hydrogen chloride followed by diethyl ether until precipitation of the hydrochloride salt product is complete. The 2-amino-5-[(2,4,6-trichlorophenoxy)-methyl]-2-oxazoline hydrochloride product is obtained as a crystalline solid which is found to melt at a temperature of 210°C. after recrystallization from absolute ethanol. The structure of the product is confirmed by nuclear magnetic resonance analysis, infrared spectroscopy and elemental analysis.

In a similar procedure, equimolar proportions of cyanogen bromide and 1-methylamino-3-(2,4,6-trichlorophenoxy)-2-propanol are reacted together to obtain 5-[(2,4,6-trichlorophenoxy)methyl]-2,3-dihydro-2-imino-3-methyl-2-oxazoline, having a molecular weight of 309.5, as a product. The product can also be named as 5-[(2,4,6-trichlorophenoxy)methyl]-2-imino-3-methyl-2-oxazolidine.

In a procedure similar to that described above, equimolar proportions of cyanogen bromide and 1-amino-3-(2,4,6-tribromophenoxy)-2-propanol are reacted together, and the free oxazoline compound is treated with excess maleic acid to obtain 2-amino-5-[(2,4,6-tribromo-phenoxy)methyl]-2-oxazoline maleate, having a molecular weight of 545, as a product.

In a similar procedure 2-amino-5-[(2,4-dichloro-6-bromophenoxy)methyl]-2-oxazoline, is prepared by the reaction of 1-amino-3-(2,4-chloro-6-bromophenoxy)-2-propanol with cyanogen bromide.

The compounds of the invention can be administered to animals in the study of chemical effects on the central nervous system, and are particularly useful as antidepressants. The compounds are typically administered to mammals at varying dosage rates depending upon route, size, age and species of animal; and effect to be produced. They can be formulated with excipients and administered according to known procedures.

In representative operations, the dosage effective to product an antidepressant response in 50 percent of the animals tested ($ED_{50}$) for 2-amino-5-[(2,4,6-trichlorophenoxy)methyl]-2-oxazoline hydrochloride is determined in standard pharmacological evaluation procedures. In such operations, this compound is found to prevent the symptoms of ptosis, piloerection and decreased activity and response to stimuli resulting from the intraperitoneal administration of 5 milligrams of reserpine per kilogram to mice, at an $ED_{50}$ of 2.5 milligrams per kilogram (mg/kg) when adminisered by intraperitoneal injection, and at an $ED_{50}$ of 9.9 mg/kg when administered orally. In other operations, the aforementioned compound is found to potentiate the symptoms of hyperexcitability, fighting and death induced by intraperitoneal administration of 5 mg/kg of amphetamine sulfate to mice aggregated in small cages. Potentiation of amphetamine is obtained with an $ED_{50}$ of 0.7 mg/kg orally and 16.3 mg/kg by intraperitoneal administration. The compound is also found to antagonize oxotremorine convulsions in mice, to protect mice against writhing induced by intraperitoneal injection of hydrochloric acid, and to inhibit muricidal behavior in rats. Its acute toxicity is determined in mice, and the compound is found to have an $LD_{50}$ of 212 mg/kg orally and 68 mg/kg by intraperitoneal injection. By way of comparison, the known antidepressant compounds imipramine and amitriptyline hydrochloride have been found to have intraperitoneal $LD_{50}$'s of 9568 and 90 mg/kg; to potentiate amphetamine at $ED_{50}$'s of 50 and 14 mg/kg and to antagonize reserpine at 35 and 46 mg/kg, respectively. In contrast, the known compound 2-amino-5-phenoxymethyl-2-oxazoline hydrochloride has been found to have little significant effect in antagonizing reserpine, protecting only 30 percent of the mice tested when administered at one third its $LD_{50}$. The intraperitoneal $ED_{50}$ of the unsubstituted phenoxy compound in potentiating amphetamine has been found to be 2.4 mg/kg, about one-sixth its acute intraperitoneal $LD_{50}$ of 14.7 mg/kg.

What is claimed is:

1. A member of the group consisting of compounds corresponding to the formula

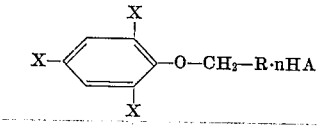

wherein X independently in each occurrence thereof represents chloro or bromo, R represents 2-amino-2-oxazolin-5-yl or 2,3-dihydro-2-imino-3-methyl-2-oxazolin-5-yl; n represents one of the integers zero and one and HA represents the acid moiety of a non-toxic acid addition salt.

2. A compound of claim 1 wherein R represents 2-amino-2-oxazolin-5-yl.

3. A compound of claim 1 wherein X represents chloro in all three occurrences thereof.

4. A compound of claim 3 wherein R represents 2-amino-2-oxazolin-5-yl.

5. A compound of claim 1 wherein the compound is 2-amino-5-[(2,4,6-trichlorophenoxy)methyl]-2-oxazoline.

6. A compound of claim 1 wherein the compound is 2-amino-5[(2,4,6-trichlorophenoxy)methyl]-2-oxazoline hydrochloride.

* * * * *